C. H. SCHENCK.
CULTIVATOR.
APPLICATION FILED MAY 3, 1913.
1,084,823.
Patented Jan. 20, 1914.
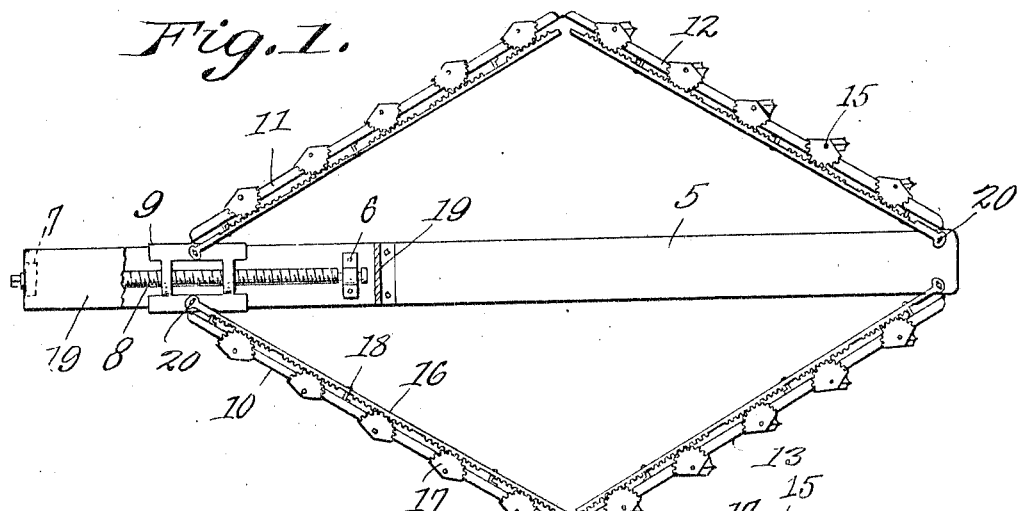
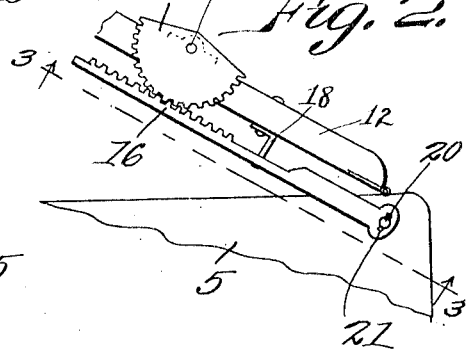
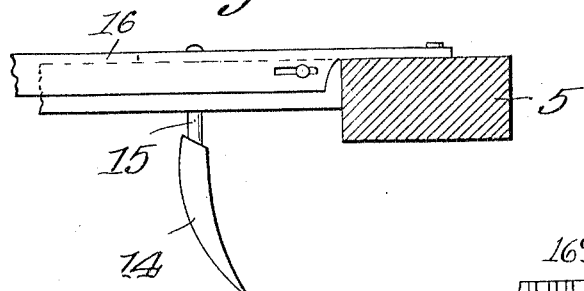
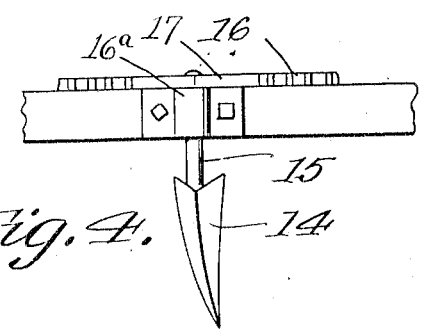
Witnesses
P. A. Putnam
L. E. Barkley
Inventor
Charles H. Schenck,
By Franks. Aaaleman,
Attorneys

UNITED STATES PATENT OFFICE.

CHARLES H. SCHENCK, OF CHATTANOOGA, TENNESSEE.

CULTIVATOR.

1,084,823.  Specification of Letters Patent.  Patented Jan. 20, 1914.

Application filed May 3, 1913. Serial No. 765,352.

*To all whom it may concern:*

Be it known that I, CHARLES H. SCHENCK, a citizen of the United States of America, and resident of Chattanooga, in the county of Hamilton and State of Tennessee, have invented certain new and useful Improvements in Cultivators, of which the following is a specification.

This invention relates to harrows and diggers and particularly to a device of the character noted which is adjustable in width, according to the requirements in use, novel means being provided for automatically adjusting the teeth of the harrow or cultivator in order that they may likewise occupy a position in a line parallel with the beam of the cultivator, which automatic arrangement is a distinct advantage in that it insures proper movement of the earth being treated by the implement; the invention being adapted particularly to shallow cultivation and mulching.

An object of this invention is to provide an implement of the character indicated having novel means for adjusting the sections of the implement in unison from a central or single point, thus making it convenient to shift the parts to suit the requirement as indicated.

A still further object of this invention is to provide an implement having earth working teeth, means being associated therewith for partially rotating the teeth in proper direction to cause them to assume a position parallel with the beam, novel means being provided for moving the said teeth, and means being furthermore provided for retaining the teeth moving means in operative position.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views and in which—

Figure 1 illustrates a plan view of an implement embodying the invention, the housing thereof being broken away; Fig. 2 illustrates an enlarged detail view of a fragment of the implement shown in Fig. 1; Fig. 3 illustrates a sectional view on the line 3—3 of Fig. 2; and Fig. 4 illustrates a detail view of a fragment of the frame showing one of the teeth in elevation.

In these drawings 5 denotes a beam which may be of any appropriate type for the purpose of carrying the operating parts of the implement, the said beam having at its rear end journal bearings 6 and 7 for holding a worm 8 in place, the said worm engaging a frame 9 which is moved longitudinally of the beam, according to the direction of rotation of the worm, the said mechanism being provided for the purpose of controlling the relation of the sections of the frame, to be hereinafter described.

The implement frame, whether it be a harrow or cultivator, is shown as comprising four sections 10, 11, 12 and 13, two of which are on each side of the beam 5. The sections 10 and 13 are hinged together at their ends and are likewise hinged to the frame 9 and beam 5 respectively. The frame sections 11 and 12 are likewise hinged together and to the frame 9 and beam 5 respectively; thus as the frame 9 is moved longitudinally of the beam, the frame sections on each side of the beam are oscillated with respect to the said beam and the implement is widened or narrowed according to the movement imparted to the sections of the frame thereof.

The teeth 14 have shanks 15 which are mounted in bearings 16$^a$ secured to the sections of the frame and the upper ends of said shanks are provided with toothed segments 17 by which movement or rotary motion is communicated to the shanks of the teeth or by which the said teeth are held at different positions of adjustment in a manner to be presently explained.

A rack 16 extends parallel with each section of the frame and the teeth of each rack engage the teeth of the segments which are associated with the implement teeth journaled with respect to the said frame, that is to say, each shank 15 of the teeth 14 which projects above the section of the frame and having thereon the toothed segment 17 is under the influence of the rack 16 associated with that particular section of the frame. One end of each rack is pivoted to the member to which the frame section with which it is associated is pivoted, and each frame section has brackets 18 which act as guides for the rack, which is associated with the said section, said brackets being for the purpose of retaining the racks in proper operative relation to the toothed segments with which they coact.

While the invention has been heretofore referred to as a harrow or cultivator, it is obvious that a combined harrow and cultivator may be made according to the teeth employed in connection with the frame, that is to say, harrow teeth may be placed in the front frame section and cultivator teeth in the rear frame sections so that by a single draft, two purposes could be accomplished. The inventor might modify the device by placing shovels in the rear frame and thereby make furrows, while using the front frame sections as harrows thus enabling the user with one draft to harrow the ground and form the furrows.

As has been stated, the frame sections may be moved to increase or diminish the width of the implement whether it be a cultivator or a harrow, and as it is desirable at all times to maintain the position of the teeth of the harrow in a line parallel with the line of the beam, any movement which is communicated to the sections of the frame results in partially rotating the teeth automatically so that they maintain their proper positions with relation to the beam. The worm 8 is protected by a housing 19, which is broken away in Fig. 1 to show the parts more clearly in plan.

In order to compensate for the movement of the racks independently of the frame sections, the ends of said bars where they are mounted on the pivots 20 are provided with slots 21, thus allowing for such universal movement as will permit them to follow the frame sections in their movement and to maintain positions parallel with said sections.

I claim—

1. In a cultivator, a beam, a cultivator frame consisting of sections on each side of the beam, the said sections having their adjacent ends pivotally connected, means for pivotally connecting the outer ends of said sections to the beam, teeth having shanks rotatably mounted on the frame sections, toothed segments on the shanks, and means for communicating motion to the toothed segments proportional to the movement of the sections of the frame, and means for moving the sections of the frame.

2. In a cultivator, a beam, a cultivator frame comprising sections on each side of the beam, means for pivotally connecting the adjacent ends of the sections, means for pivotally connecting the outer ends of said sections to the beam, teeth having shanks rotatably mounted on the frame, toothed segments on the shanks, and a rack for each section of the frame, means for pivotally connecting one end of each rack to the beam, means for moving the sections of the frame, and means for retaining the racks in operative engagement with the toothed segments.

3. In a cultivator, a beam, a frame, sections on each side of the beam, means for pivotally connecting the ends of the sections of the frame to the beam, a member movable with relation to the beam, means for pivoting the ends of other sections of the frame to the movable member, means for pivotally connecting the adjacent ends of the frame sections together, teeth having shanks rotatably mounted on the frame, a rack for the segments of each frame section, and means for maintaining the racks in such relation to the segments as to partially rotate the segments when the frame sections are moved.

In testimony whereof, I affix my signature in the presence of two witnesses.

CHARLES H. SCHENCK.

Witnesses:
L. M. THOMAS.
W. G. M. THOMAS.